(12) United States Patent
Heise et al.

(10) Patent No.: US 11,593,349 B2
(45) Date of Patent: Feb. 28, 2023

(54) MASTER DATA SUBSTITUTION

(71) Applicant: SAP SE, Walldorf (DE)

(72) Inventors: Torsten Heise, Heidelberg (DE); Martin Heitlinger, Walldorf (DE); Wolfram Schick, Karlsruhe (DE); Thomas Werth, Walldorf (DE); Dominique Bosselmann, Walldorf (DE); Volker Jaeck, Nussloch (DE); Andreas Krause, Karlsruhe (DE); Duncan Bryce, Walldorf (DE); Anja Burak, Walldorf (DE); Maik Druschke, Walldorf (DE); Fabian Hornung, Walldorf (DE); Jibi Joseph Vadakayil, Sankt Leon Rot (DE); Juliane Wagner, Walldorf (DE)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 16/863,708

(22) Filed: Apr. 30, 2020

(65) Prior Publication Data
US 2021/0342328 A1 Nov. 4, 2021

(51) Int. Cl.
*G06F 7/00* (2006.01)
*G06F 17/00* (2019.01)
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 10,068,002 | B1 * | 9/2018 | Wilczynski | G06F 16/275 |
| 2006/0218346 | A1 * | 9/2006 | Nagumo | G06F 11/1466 711/114 |
| 2012/0158642 | A1 * | 6/2012 | Ebrahimi | G06F 8/30 707/600 |
| 2012/0246110 | A1 * | 9/2012 | Fischer | G06F 16/283 707/602 |
| 2012/0303692 | A1 * | 11/2012 | Anand | H04L 67/02 709/201 |
| 2015/0363424 | A1 * | 12/2015 | Strong | G06F 16/275 707/634 |
| 2017/0177595 | A1 * | 6/2017 | Kirsch | G06F 11/1458 |

OTHER PUBLICATIONS

European Search Report dated Sep. 29, 2021 on European Patent Application No. EP 21171145.2.

* cited by examiner

*Primary Examiner* — Tuan A Pham
(74) *Attorney, Agent, or Firm* — Mintz Levin Cohn Ferris Glovsky and Popeo, P.C.

(57) ABSTRACT

A method, a system, and a computer program product for execution master data substitution. One or more first data objects in a master data storage are determined for replacement. One or more second data objects are identified for replacing the first data objects for storage in the master data storage. Replacement of the first data objects with the second data objects is performed in accordance with one or more data object requirements. Replacement of the first data objects by the second data objects is executed in accordance with the one or more data object requirements. A resulting replacement data set is generated and stored.

20 Claims, 15 Drawing Sheets

FIG. 4a

Master Data Substitutions

| Type | Illustration | |
|---|---|---|
| 1:1 | Battery → Battery Varta | 402 |
| Self | Product ↔ Product | 404 |
| Full Interchangeability | Battery Bosch ↔ Battery Varta | 406 |
| Chains | Battery → Battery Varta → Battery Varta V2 | 408, 410 |
| Stop | Battery → Battery Varta ✗ Battery Varta V2 | |
| Many-to-one (N:1) | {Battery Bosch, Battery Varta, Battery Panasonic} → Battery | 412 |
| One-to-many (1:N) | Battery → {Battery Bosch, Battery Varta, Battery Panasonic} | 414 |
| Leading | Battery → {Battery Bosch (Leading), Battery Varta, Battery Panasonic} | 416 |

FIG. 4b

Master Data Substitutions

| Type | Illustration |
|---|---|
| Sequences | Product A → Product B ③, Product C ⓪, Product D ②; Product A → Product C, Product D, Product B |
| Sets | Computer → {Desktop, Keyboard, Display} Set |
| Time Dependency | Display 4K (2019-07-01) → Display 4K V2 (2020-02-01) → Display 4K V3 (2020-08-31) |
| Conversion Factors | Sixpack [1] → Bottle [6] |
| Versions | Battery → Battery Varta (Version 0); Battery → Battery Varta (Version 1) |

Master Data Exclusions - Features

| Type | Illustration | |
|---|---|---|
| Exclude <br> 602 | Product A, Product B, Product C, Product D | Product A, Product C, Product D |
| Time Dependency <br> 604 | Product A, Product B, Product C, Product D ← 2020-02-01 | Product A, Product C, Product D · Product A, Product B, Product D ← 2020-03-01 → t |
| Versions <br> 606 | Product A, Product B, Product C, Product D | (Product A, Product D) Version 0 · (Product A, Product C, Product D) Version 1 |

FIG. 6b

Master Data Exclusion - Features  600

| Type | Illustration | |
|---|---|---|
| Status  608 | Product A, Product B, Product C, Product D | Product A, Product B, Product D |
| Reasons  610 | Product A, Product B, Product C, Product D | Product A (Quality), Product C, Product D |

FIG. 6c

Master Data Exclusion – Group Features

600

| Type | Illustration |
|---|---|
| Groups<br><br>612 | Product A<br>[Product B, Product C] Quality<br>Product D |
| Group Time Dependency<br><br>614 | Product A<br>[Product B, Product C] Quality<br>Product D<br>↑ t<br>2020-03-01: Product A, Product B, Product C, Product D<br>2020-02-01: Product A, Product D |
| Group Status<br><br>616 | Product A<br>Product B<br>[Product C] Quality<br>Product D |

MASTER DATA SUBSTITUTION

TECHNICAL FIELD

This disclosure relates generally to data processing and, in particular, to querying graph data from a database, and more particularly, master data substitution processes.

BACKGROUND

A database may be configured to store data in accordance with a database schema. For example, in a graph database, data may be represented and stored using graph structures including, for example, vertices, directed edges, undirected edges, and/or the like. Notably, the graph database may store relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items. However, existing databases do not provide for an ability to perform substitution of one master data entity with another.

SUMMARY

In some implementations, the current subject matter relates to a computer implemented method for executing master data substitution. The method may include determining one or more first data objects in a master data storage for a replacement, and identifying one or more second data objects for replacing the first data objects for storage in the master data storage. The replacement of the first data objects with the second data objects may be performed in accordance with one or more data object requirements. The method may further include executing, in accordance with the data object requirements, replacement of the first data objects by the second data objects, and generating and storing a resulting replacement data set.

In some implementations, the current subject matter may include one or more of the following optional features. The data object requirements may include a requirement that the first data objects and the second data objects are equivalent data objects (e.g., equal substitution). The data object requirements may include a requirement that a number of the first data objects is replaced with the same number of the second data objects. The data object requirements may further include a requirement that a number of the first data objects is replaced with a smaller number of the second data objects. Also the data object requirements may include a requirement that a number of the first data objects are replaced with a greater number of the second data objects. Moreover, the data object requirements may include a requirement that the first data objects are replaced with the second data objects at one or more predetermined times. Further, the data object requirements may include a requirement that a group of the first data objects are replaced with a group of the second data objects.

Also, the data object requirements may include a requirement that at least one of the first data objects and the second data objects are excluded from the generated resulting data set. In some implementations, data objects may be excluded from the generated resulting data set based on at least one of the following: one or more predetermined periods of time, one or more versions of the first data objects, one or more groups of the first data objects, one or more statuses of the first data objects, and any combination thereof.

In some implementations, the data objects may be stored as graph data objects in one or more graph data tables in the master data storage. The graph data tables may include at least one of the following: one or more vertex tables, one or more edge tables, and any combination thereof. The graph data objects may include at least one of the following: one or more vertices, one or more edges, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 4a-c illustrate various master data substitutions that may be executed by the system shown in FIG. 3, according to some implementations of the current subject matter.

FIGS. 6a-c illustrate an exemplary table including various substitute exclusions, according to some implementations of the current subject matter.

DETAILED DESCRIPTION

In some implementations, the current subject matter may be configured to execute substitutions or replacements of various objects that may be stored in a master data (e.g., master dataset). This may be accomplished by determining which objects in the master dataset may be substituted or replaced. Once those are identified, other objects may be used to replace them in the master dataset. The replacement may be executed in accordance with various requirements (as discussed below). Once substitution or replacement is performed, a resulting dataset may be generated and stored and/or displayed to the user.

In some implementations, the master dataset may be stored in a database that may be configured to store a graph by at least storing corresponding graph data in a vertex table and an edge table. For example, storing the graph in the database may include storing, in the vertex table, the vertices of the graph including, for example, the keys and the attributes associated with each vertex. Also, storing the graph in the database may include storing, in the edge table, the edges of the graph including, for example, the keys and the attributes associated with each edge.

Figure 1:
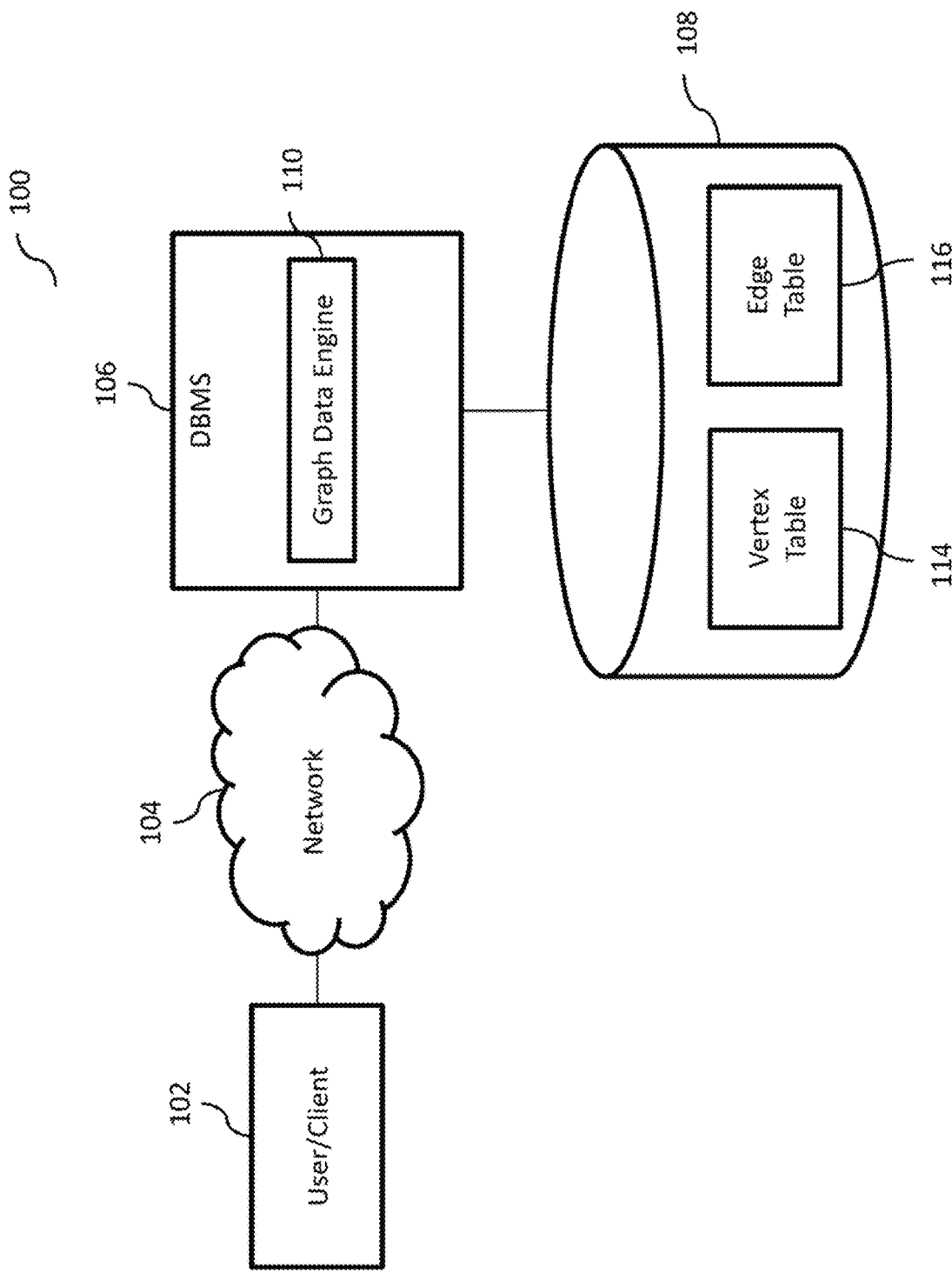
FIG. 1 illustrates a system diagram illustrating a data storage system, according to some implementations of the current subject matter.

FIG. 1 illustrates a system diagram illustrating an exemplary data storage system 100, according to some implementations of the current subject matter. The system 100 may include a database management system (DBMS) 106, a database 108 storing graph data, and a user/client 102. In some implementations, the database 108 may be a database configured to store graph data, for example, in a vertex table 114 and/or an edge table 116. The database 108 may be any type of database including, for example, an in-memory database, a hierarchical database, an object database, an object-relational database, a non-Structured Query Language (NoSQL) database, and/or the like. The database 108 may be a graph database, a column store, a key-value store, a document store, and/or the like.

The database 108 may be communicatively coupled with the database management system 106 that may include a graph data engine 110. The database management system 106 may be configured to respond to requests from one or more users 102 of the data storage system 100. The user 102 may communicate with the database management system 106 via a network 104, which may be any wired and/or wireless network including, for example, a public land mobile network (PLMN), a wide area network (WAN), a local area network (LAN), a virtual local area network (VLAN), the Internet, and/or the like. The user 102 may send to the database management system 106 a request to execute, on at least a portion of the graph data stored in the database 108, a graph algorithm including, for example, shortest path, risk propagation, minimum flow, page rank, and/or the like. A graph algorithm may be any algorithm that derives a solution by operating on graph data which may include vertices interconnected by one or more directed and/or undirected edges. The graph algorithm may be any predefined graph algorithm and/or a custom graph algorithm defined by the user 102. In some implementations, the graph data may be constructed from one or more tables and may be stored in the database 108.

In response to the request from the user 102, the graph data engine 110 (which may include one or more processors and/or memory) of the database management system 106 may be configured to generate an interface for accessing data from one or more tables stored in the database 108. The graph data engine 110 may be configured to execute the graph algorithm of the request by querying the graph data stored in the database 108 to obtain the desired results. The generated interface may be used to present results responsive to the user 102's request. The results may be arranged in a tabular format. The tabular arrangement of the results may be queried using one or more SQL queries (including, but not limited to, table, view, etc. functions).

Figure 2:
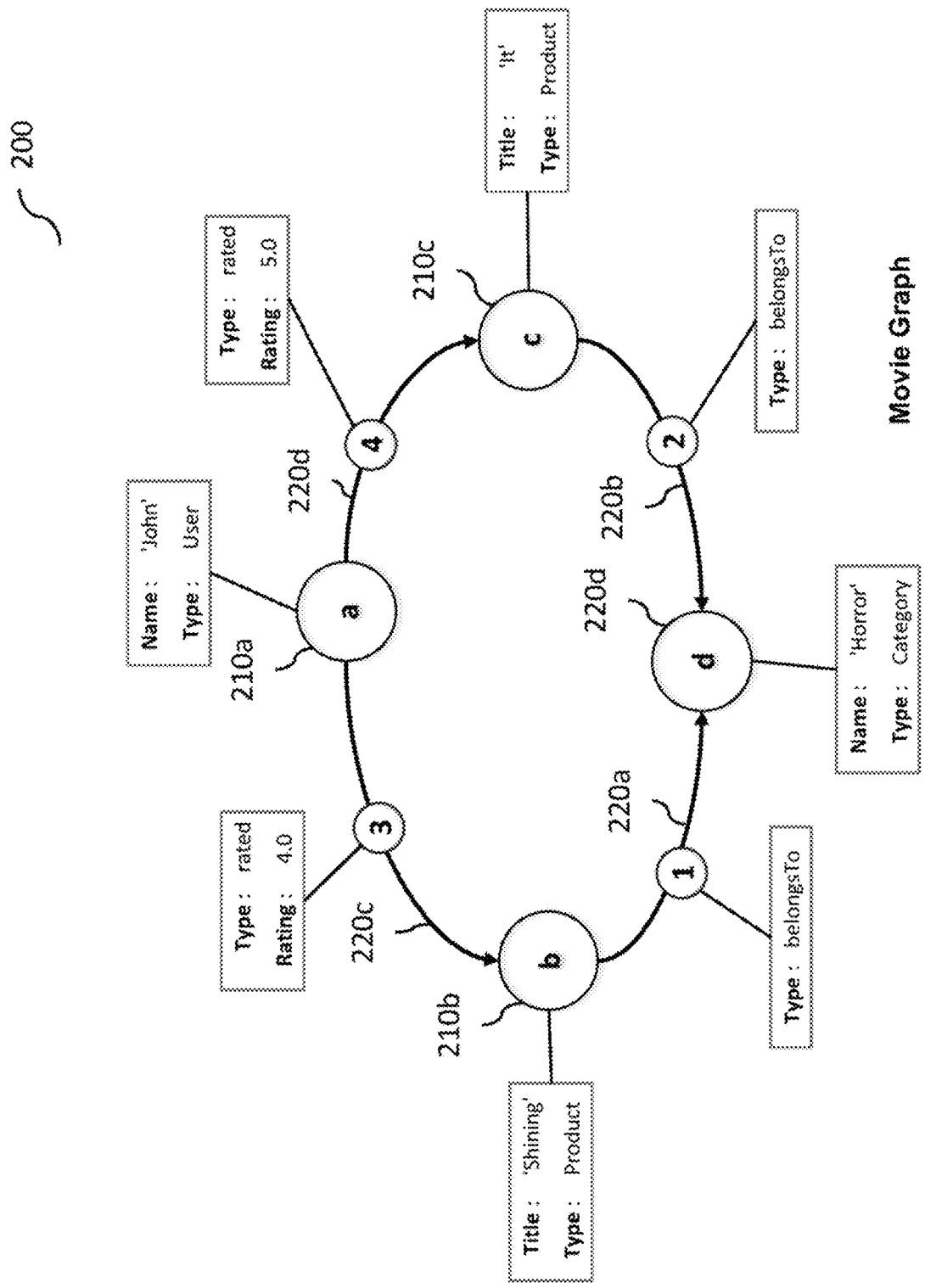
FIG. 2 illustrates an exemplary graph data, according to some implementations of the current subject matter.

FIG. 2 illustrates an exemplary graph data 200 (e.g., showing a movie graph data) that may be stored in the database 108 and may be requested by the user 102, according to some implementations of the current subject matter. The graph data 200 may be stored in the database 108 in the vertex table 114 and/or the edge table 116. The graph data 200 may include a plurality of vertices including, for example, a first vertex 210a, a second vertex 210b, a third vertex 210c, and a fourth vertex 210d. Further, the plurality of vertices may be interconnected via a plurality of directed edges: a first edge 220a, a second edge 220b, a third edge 220c, and a fourth edge 220d.

Each vertex and/or edge in the graph data 200 may be associated with a key that uniquely identifies the corresponding vertex and/or edge. For example, the first vertex 210a may be associated with the key "a," the second vertex 210b may be associated with the key "b," the third vertex 210c may be associated with the key "c," and the fourth vertex 210d may be associated with the key "d." The first edge 220a may be associated with the key "1," the second edge 220b may be associated with the key "2," the third edge 220c may be associated with the key "3," and the fourth edge 220d may be associated with the key "4." Each vertex and/or edge in the graph data 200 may also be associated with one or more attributes. For example, each of the first vertex 210a, the second vertex 210b, the third vertex 210c, and the fourth vertex 210d may be associated with a "Title" attribute and a "Type" attribute. Each of the first edge 220a, the second edge 220b, the third edge 220c, and the fourth edge 220d may be associated with a "Type" attribute and/or a "Rating" attribute.

In some implementations, the user 102 may send to the database management system 106 a request to execute a graph algorithm on the graph data 200. In response to the request, the graph data engine 110 may be configured to generate an interface for accessing data from one or more tables stored in the database 108. In particular, the graph data engine 110 may be configured to execute a query of the graph data stored in the database 108 to obtain the desired results responsive to the request. The graph data engine 110 may be further configured to generate a specific query on a graph data stored in the database 108 that may be used to read data from tables stored in the database 108. The generated interface may then be used to present results responsive to the user 102's request. The results may be arranged in a tabular format, which may be used for execution of one or more SQL queries.

In some implementations, the current subject matter may be configured to as computing system, a computing object, an application, an interface (e.g., an application programming interface (API)), etc. configured to execute various object substitutions of objects and/or groups of objections stored in a master data structure for other objects and/or groups of objects. For example, in a master data set, a "MasterDataObject" may be an object in a database. A "MasterDataSubstitute" may be defined as a substitute, e.g., an object that substitutes another object for various reasons. For example, object "A" is substituted by its new version, object "B". The substitute object may be a master data object. The objects and/or groups of objects may be identified by various parameters, identifiers, features, and/or in any other way. The master data objects may be stored in a database, e.g., database 108 shown in FIG. 1. In some implementations, the master data database structure may be defined automatically, by a particular user, and/or in any desired way. Some exemplary, non-limiting implementations of the current subject may be configured to provide product substitutions for logistic applications. The new object may be generic so that it may support all types of master data substitutions, e.g., product substitutions. In some implementation, to execute object substitutions, the user 102 may be configured to use an API that may allow substitutions of data objects that may be stored in the same, another, etc. format and/or stored and/or accessed by different algorithms.

In some implementations a substitution ("MasterDataSubstitution") may define that a master data object may be substituted by another object. The master data substitution may be "master data". All other data may be configuration/customizing. The substitution data may be defined compatible to the graph engine 110 (shown in FIG. 1) requirements for edges. The graph engine 110 may be used to access substitution data. Whenever a substitution is created, changed, or deleted, it may be verified that all substitutions of the corresponding rule and group are still consistent. The substitution identifier (ID) may a technical ID that may be automatically generated, if not provided by the user. Thus, a GUID may be used as ID. Attributes of a substitution may include: UUID, Type, Object, Substitute, Group, Set, Lead, Valid from, Valid to, Numerator, Denominator, Sequence, Reason, Status, Version, Stop, etc. (as discussed below).

In some implementations, a group (e.g., "MasterDataSubstitutionGroup") may define substitutions that go together and/or have similar traits and/or characteristics. Attributes of a group may include: ObjectTypeCode, Name, Description, Parent, etc. A parent group ("MasterDataSubstitutionParentGroup") may define another group as the parent of a group. This way a hierarchy of groups may be defined, which may allow a flexible way to build and/or structure groups. The parent group may be an optional attribute of the group.

By way of an example only, in various logistic processes master data may be defined as interchangeable, when one master data entity may be substituted by another one. For example, the product '2 TB SDD hard disc' of one manufacturer 'M1' that has the same technical specification as a corresponding hard disc of another manufacturer 'M2' may be substituted in a sales order process when there is no availability of the first hard disc, but only of the second one. Moreover, substitution of locations, products, location products, etc. may also be possible.

Various substitutions of objects may be performed by the current subject matter system 100. For example, the system 100 may be configured to substitute products with identical products (e.g., form-fit-function (FFF) class). An FFF class may be a product of type "FFFC" (form-fit-function class) and may be configured to have it has only basic data. A product may be identical in respect of its technically-relevant properties (e.g., form, fit, and function) to another product, if both products are assigned to the same FFF class. Information that products are identical to other products, and thus, may be substituted, may be already contained in the product master data itself. Hence, it might not be necessary to store this information redundantly in the new substitution master data. However, some implementations of the master data substitution API may be configured to access that data and substitute products with identical products. Alternatively, or in addition to, information that products are considered as "identical" may be stored in the new substitution master data.

In some exemplary implementations, the system 100 may be configured to substitute products with new versions (e.g., supersession). The new substitution master data may be configured to support time dependent substitutions of products. For example, it might be possible to substitute product "A" from date 2019-08-01 on by product "A_V2", and to substitute "A_V2" from date "2019-09-01" on by product "A_V3". Thus, at 2019-07-01 product "A" is not substituted, at 2019-08-04 product "A" is substituted by "A_V2", and at 2019-10-02 product "A" is substituted by "A_V3".

In some further exemplary implementations, the system 100 may be configured to substitute products with new versions and identical products. It may be possible to use new substitution master data in combination with existing data, e.g., as with the FFF classes. For example, there are FFF identical products "A", "B", and "C", whereby this information may be stored in the product master data. Additionally, for product "C" there is a new version "C_V2" that is valid from date "2019-08-01". This information may also be stored in the new substitution master data. The system 100 may be configured to execute master data substitution as follows: at 2019-07-01 "A" is substituted by "B" or "C", and at 2019-08-01 "A" is substituted by "B" or "C_V2".

In some yet further exemplary implementations, the system 100 may be configured to substitute product sets (e.g., kits). It may be possible to substitute a set product by its components. For example, the product "headlight" may be substituted by the corresponding "case", the "bulb", and some "screws".

In still further exemplary implementations, the system 100 may be configured to execute different substitutions depending on characteristics values. For example, it may be possible to define a list of characteristics and to execute different substitutions depending on the characteristic values. For example, for premium customers, a new version of a product may be available earlier than for standard customers.

Figure 3:
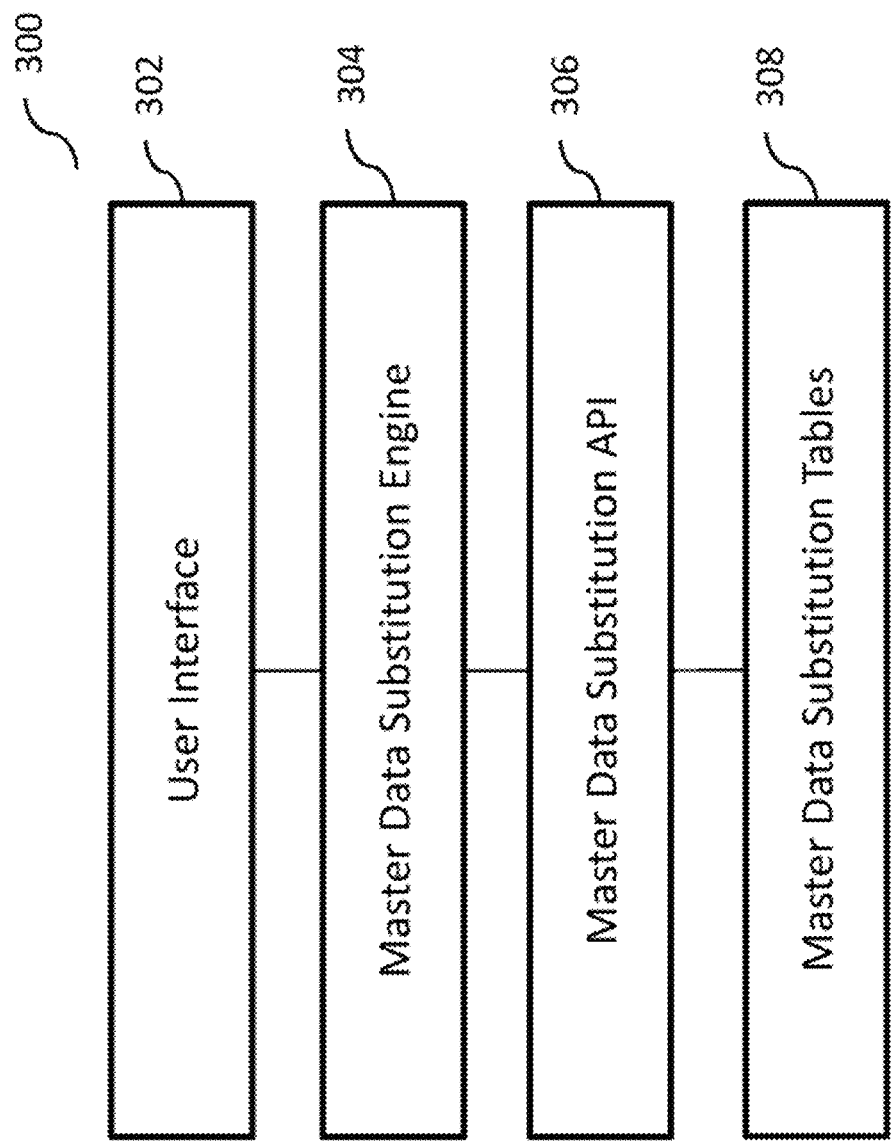
FIG. 3 illustrates an exemplary system that may be configured to execute master data substitutions of computing objections, according to some implementations of the current subject matter.

FIG. 3 illustrates an exemplary system 300 that may be configured to execute master data substitutions of computing objections, according to some implementations of the current subject matter. The system 300 may be configured to be incorporate into the system 100 shown in FIG. 1. The system 300 may include a user interface 302, a master data substitution computing engine 304, a master data substitution API 306, and a storage component that may include one or more master data substitution tables 308. The system 300 may be used in cloud-based environment and/or a non-cloud-based environment.

In some implementations, the user 102 (shown in FIG. 1) may be configured to access the system 300 using user interface 302. The user 102 may be configured to query the engine 304 to determine whether there are object substitutions that may be performed. Alternatively, the engine 304 may automatically determine one or more object substitutions for one or more objects that may be of interest to the user 102. The engine 304 may be configured to access one or more master data substitution tables 308 using master data substitution API 306 to determine whether substitutions may be executed (as will be discussed below).

FIGS. 4a-6c illustrate various substitution types and features, according to some implementations of the current subject matter. Object substitutions may be a set of all objects and their substitutions that may be defined as a directed graph. The objects may be nodes in the graph, the substitutions may be edges in the graph (e.g., as for example is discussed above with regard to FIGS. 1-2). For the purposes of executing substitutions, the system 300 may be configured to consider the edges, as opposed to the nodes. To store edges in a database table, each edge may include a unique ID "n". Additionally, one or more attributes for edges which may be used for various purposes, e.g., filtering and sorting, may also be stored.

For example, an edge with ID "n" in a graph from node "A" to node "B" may be noted as "n: A→B" or simplified as "n" or as (non-unique) "A-B". Edges may be directed, which may mean that an edge may point from a source node to a target node. If "A" may be substituted by "B", but also "B" may be substituted by "A", then this relationship may be described by two separate edges: "n: A→B" and "m: B→A" and will not be combined into a single edge. This is because of edge attributes that may depend on a direction of an edge and would not make sense in the other direction. Edges may have simple attributes, which may be noted as a name value pair with the edge, e.g., "n: A→B: attr1='value1', attr2='value2'". Some attributes may have default attribute values, which may be used when no specific values are defined. This means that attributes with default values may be optional. Further, there may be other attributes that may be mandatory, which may mean that they must be specified when an edge is created.

In some implementations, a source (e.g., "MasterDataSubstitutionSource") may define how a substitution data may look like and which logic (implementation) may be used to access the substitution data. An application that may execute a substitution, may call the master data substitution with the source to obtain an instance of the corresponding master data substitution API. The attributes of the source may include SourceName, Description, ObjectTypeCode, Rule, implementation, etc.

By way of a further example, an object "A" may be substituted by object "B" if there is a path of edges from "A" to "B". If "A" is substituted by "B", but "B" may also be substituted by "A", at least two edges may be defined, for example "n: A→B", and "m: B→A". "A" may be substituted by "B" may be noted as "A sub (B)". Different notations may be used for substitutions and edges, because the result of a substitution is not always a single node, it may also be a set of nodes (e.g., "A sub (B, C)"), or there may be no substitution (e.g., "A sub ( )"). Some edge attributes may be aggregated to a substitution attribute and may be noted as "A sub (B), attribute='value'".

Figure 4C:
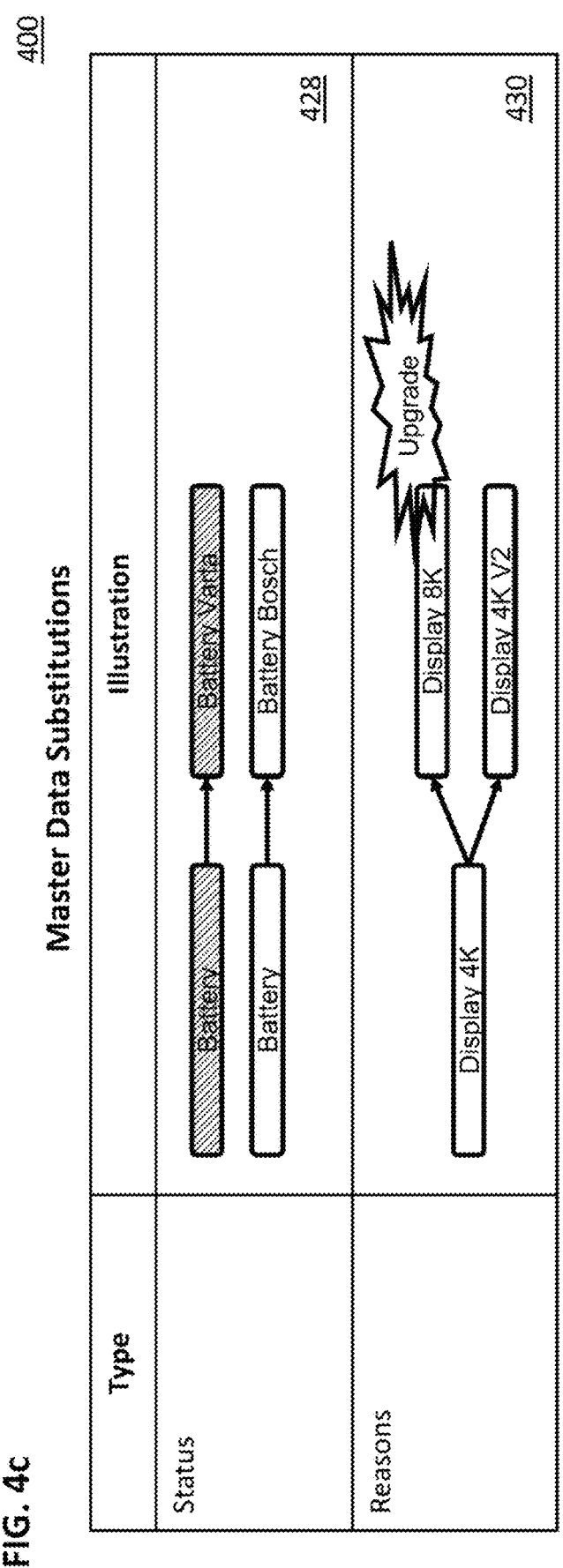

Further, there may be various cardinalities of substitution of objects, as discussed below. All other types may be combinations of these types. FIGS. 4a-c illustrate various master data substitutions 402-430 that may be executed by the system 300, shown in FIG. 3. For example, substitution 402 may be referred to as a 1:1 substitution, which may mean that one object is substituted by exactly one other object, e.g., object "A" may be substituted by object "B". This may be denoted as one edge "A→B", or one substitution "A sub (B)". As shown in FIG. 4a, substitution 402 may involve substitution of "Battery" for "Battery Varta", where the substitution may be directed. Another example is substitution 404 that is "Self substitution" where one product may be substituted by the same product. This substitution may return the input object with default attribute values. Yet another example of the 1:1 substitution may include full interchangeability substitution 406, whereby one product (e.g., "Battery Bosch") may be substituted by another (e.g., "Battery Varta"). These substitutions may be bi-directional. Chains may also be another example (as shown by the substitution 408 in FIG. 4a). Here, there may be several substitutions (e.g., "Battery" by "Battery Varta" by "Battery Varta V2"). Additionally, a stop substitution 410 may be used to differentiate between chains and simple substitutions (e.g., "Battery" by "Battery Varta" but then stop and execute substitution "Battery Varta" by "Battery Varta V2"), Another substitution cardinality may include N:1 substitution (AND logic), which may mean that several objects may be substituted by exactly one other object, e.g., objects "A" and "B" may be substituted by object "C". This means that there are edges "A→C; set='G2'" and "B→C; set='G2'". Both edges may belong to the same set. The corresponding notation may be substitution "(A, B) sub (C)". As shown in FIG. 4a, substitution 412 may involve substituting "Battery Bosch", "Battery Varta", and "Battery Panasonic" with "Battery".

Yet another substitution may include 1:N substitution (OR logic). This may mean that one object is substituted by several objects, e.g., object "A" is substituted by object "B" and "C". This means there are edges "A→B" and "A→C". To identify that both edges may be considered together, they may include an attribute "set" with the same attribute value "G1". This may be noted as the following edges: "A→B; set='G'", "A→C; set='G1'" or as corresponding substitution "A sub (B, C)". A node "C" may be used in different 1:N substitutions of node "A" by defining additional edges with different sets. For example, there may be the following edges: "A→B; set='G1'", "A→C; set='G1'", "A→C; set='G2'", and "A→D; set='G2'". This example shows that nodes alone do not define a unique edge, whereby an edge ID may be used. Moreover, Two edges with the same "set" attribute value may be in the same set, if they are in a 1:N substitution with the same source node or in an N:1 substitution with the same target node. The corresponding notation as substitutions is "A sub (B, C)", "A sub (C, D)". FIG. 4a illustrates substitution 414, whereby "Battery" may be substituted with "Battery Bosch", "Battery Varta", or "Battery Panasonic". Moreover, substitution 416 is another example of the 1:N substitution, whereby a particular substitution may be marked as "leading" (e.g., "Battery Bosch"), as compared to the other two.

In some implementations, in a sequence ("MasterDataSubstitutionSequence"), if an object can be substituted by several other objects, the sequence may provide additional information for an application which substitution may be used before another substitution. A sequence (or "sqnc") substitution may be used to define a sort order of the results of a substitution. For example, if there are two edges "A→B: sqnc='1'" and "A→C; sqnc='2'" than the corresponding substitution of "A→B" may be preferred to the substitution of "A→C". The sequence may be used to sort a result of a substitution. The sequence may be a numeric value. The following example illustrates sequence substitution.

"A" shall be substituted. There are the following relevant edges:

A→B; sqnc='1'
A→C; sqnc='3'
B→D; sqnc='2'
C→E; sqnc '4'

"A" may be substituted by "B" or "C" or "D" or "E". The following (sub-) paths (P) for the relevant substitutions may exist:

P1: A→B (sqnc='1')
P2: A→B (sqnc='1')→D (sqnc='2')
P3: A→C (sqnc='3')
P4: A→C (sqnc='3')→E (sqnc='4')

The sequence of substitutions may be defined as a maximum sequence of the edges of a corresponding path, thereby generating the following:

A sub B, sqnc='1'
A sub D, sqnc='2'
A sub C, sqnc='3'
A sub E, sqnc='4'

The edges may describe how substitution master data may be stored in a database (e.g., database 108 shown in FIG. 1 or tables 308 shown in FIG. 3). The substitutions may describe results of a substitution. Substitution 418 shown in FIG. 4b illustrates an exemplary sequences substitution. Here, sequences may be used to sort the substitution result set.

Time dependency substitution may be executed by the system 300 by using the attributes "valid_from" and "valid_to". For example, substitution 422 shown in FIG. 4b may be executed to substitute "Display 4K" with "Display 4K V2" on 2019-07-01", whereby "Display 4K V2" on 2019-07-01" may be substituted on 2020-02-01 with "Display 4K V3" and must be substituted on 2020-08-31 with "Display 4K V3". If the attribute "valid_from" is not defined or if the attribute has no value, it may be considered as valid_from, for example, "0001-01-01". If the attribute "valid_to" is not defined or if the attribute has no value, it is considered as valid, for example, to "9999-12-31". This allows for example to substitute object "A" with object "B" until a given date and after that to substitute it with object "C". This may be noted as "n: A→B; to '20190630'" and "m: A→C; from ='20190701'". If an edge is part of a set, all edges of that set may have the same validity attribute values. The time dependency attributes may also be used as substitution attributes and may be noted as "A sub (B), to ='20190630'", "A sub (C), from '20190701'". Sets have the same validity attributes. An exemplary set substitution 420 is shown in FIG. 4b (e.g., a "Computer" may be substituted with a "Set" of "Desktop", "Keyboard", and "Display" using AND logic).

Conversion factors may be assigned to an edge. The following attributes may be used: "numerator" (or "nmrtr") and "denominator" (or "dnnntr"). Default value of both factors may be "1" and/or any other values. The factors may always be defined based on a base unit of measure. The factors may be integer values and/or any other values. Using these attributes, it, for example, may be possible to substitute each multiple of 2 pieces of object "A" by 3 pieces of object "B" using the following format: "n: A→B: nmrtr='3', dnmntr='2'". The value "0" is not valid as numerator or denominator, thus, the value 0 may be considered as not defined and interpreted as 1. Conversion factors may also be available in the substitution notation. The substitution may be noted as "A sub (B[nmrtr='2', dnmntr='1'], C[nmrtr='3', dnmntr='1'])" to express that 1 "A" may be substituted by 2 "B" and 3 "C". If there are several edges, e.g., "A→B; nmrtr=3, dnmntr=2" and "B→C; nmrtr=5, dnmntr=4", the corresponding substitutions of "A" may be notated as "A sub (B); nmrtr=3, dnmntr=2" and "A sub (C); nmrtr=S, dnmntr=4". FIG. 4b illustrates exemplary conversion factors substitution 424 (e.g., "Sixpack 1" may be substituted by "6 Bottles").

Moreover, a reason (e.g., "MasterDataSubstitutionReason") may be assigned to an edge to explain why an object is substituted. The reason may explain why an object is substituted by another one. It may be possible that users define their own reasons. The reason may be used in an explanation component to inform the user why a specific substitution was executed. The reason may be an optional attribute of a substitution. Attributes may include ObjectTypeCode, ReasonCode, Description, etc. The reason may be defined via attribute "reason", which may be noted, for example, as "n: A→B; reason='new version'". The reasons and corresponding descriptions may be defined via a configuration. There might not be a default value for a reason. If an edge is part of a set, all edges of that set must have the same reason. FIG. 4b illustrates an exemplary versions substitution 426 and FIG. 4c illustrates an exemplary reason substitution 430. As shown by the substitution 426, "Battery" may be substituted by "Battery Varta" in accordance with Versions 0 or 1. As shown in FIG. 4c, the reason for a substitution may be an upgrade. For example, "Display 4K" may be substituted by "Display 8K" as an upgrade becomes available.

In some implementations, status substitution (e.g., substitution 428 as shown in FIG. 4c) may be used to differentiate between "inactive", "active", and/or "obsolete" substitutions. For example, substitution "Battery Bosch" for "Battery" may be active and "Battery Varta" for "Battery" may be inactive (as shown by the grey pattern) and thus, might not be available and/or used.

In some implementations, a group may be used to define substitutions that may be considered together. Thus, a group may be considered as a filter of substitutions. All edges of the same group may have the same group value. An edge with a specific group may be as: "n: A→B: group='group_1'". An initial group value may be valid. Group substitution may be used for all substitutions which are not assigned to a specific group. A 'default group' may be defined for an initial group. Group substitutions may be arranged in hierarchies. A group may only be part of one group hierarchy (e.g., defined by a "parent group" attribute). A substitution may be assigned to multiple groups. Several groups (and/or group hierarchies) may be assigned to a control. A control ("MasterDataSubstitutionControl") may be used to determine all groups used for the substitution. The control may be determined by an application that is using the substitution API. Attributes of a control may include: ObjectTypeCode, ControlName, Description, Group 1, Group 2, etc. Further, a control determination is an application specific separate step that may be executed outside of an API (e.g., API 306 shown in FIG. 3). A control determination may be based on a characteristics catalog for document-based applications, identifiers, aspects of planning applications, etc. Substitutions, which are not assigned to a group, may always be executed. Further, groups may be time-dependent. A validity of a group may overrule validity of substitutions. Also, validity may be inherited in the group hierarchy.

Figure 5:
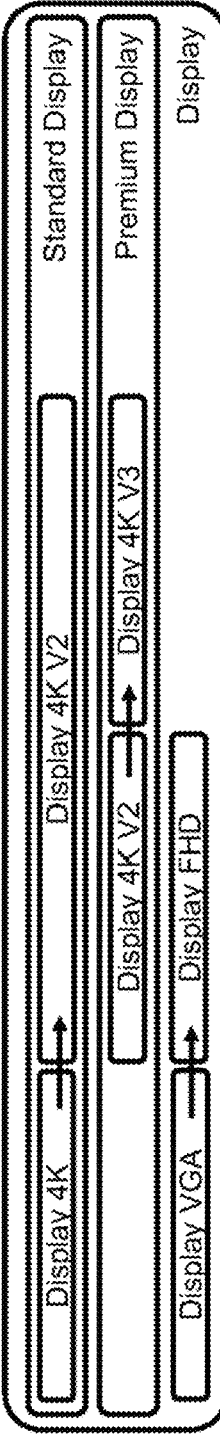
FIG. 5 illustrates a table that illustrates exemplary group substitutions, according to some implementations of the current subject matter.

FIG. 5 illustrates a table 500 that illustrates exemplary group substitutions 502-506, according to some implementations of the current subject matter. As shown in the group substitutions 502-506, objects referring to displays may be substituted based on time and whether such displays are premium or standard. For example, in the "Standard Display" category, "Display 4K" must be substituted on 2019-

07-01 by "Display 4K V2". Whereas, in the "Premium Display" category, "Display 4K" is not available, but instead, "Display 4K V2" may be substituted by "Display 4K V3" starting 2020-02-01. Moreover, displays may be also substituted based on various aspects of the displays (e.g., "Display VGA" substituted by "Display FHD" starting 2019-07-01).

In some implementations, it may be possible to exclude objects from a result set of the substitution. An exclusion ("MasterDataSubstitutionExclusion") may define which objects may be excluded from the master data substitution. The attributes of an exclusion may include: UUID, Type, Object, Group, ValidFrom, ValidTo, Reason, Version, etc. Exclusion may be executed by filtering out substitutes of the substitution result set. As stated above, a group may be assigned to a master data object and structured hierarchically, whereby groups may be assigned to a substitution control. That control may be provided by the calling application (e.g., user 102 application and/or any other application). For example, a control determination may be based on a characteristics catalog (e.g., catalog of object characteristics).

FIGS. 6a-c illustrate an exemplary table 600 including various substitute exclusions 602-616, according to some implementations of the current subject matter. As shown in FIG. 6a, substitution exclusion process 602 may be configured to exclude an object (e.g., "Product B") from a result set, whereby starting set included products A, B, C, D, and the substitute result set now includes products A, C, D. Exclusions may also be time-dependent. For example, as shown by the substitution 604, starting from the initial set of products A, B, C, D, product B may be excluded from an intermediate substitution result set on 2020-02-02, thereby generating a result set of products A, C, D. However, on 2020-03-01, product B may be included as a substitution, but product C may be excluded, thereby generating a result set of A, B, D.

Further, versions may also be applicable. As shown by substitution 606, starting from the initial product set of A, B, C, D, a version 0, containing only products A and D, may be produced, whereby the initial product set may be substituted with version 0. When version 1, containing only products A, C, D, is generated, it may be used to substitute for version 0 and/or for the initial product set.

Moreover, status of a product may be used to differentiate between "inactive", "active", "obsolete", etc. for the purposes of exclusion (for example, only active exclusions may be considered). As shown by the substitution exclusion 608, product B from the initial set A, B, C, D may be deemed to be inactive and product C may be considered for the purposes of active exclusion in the resulting set A, B, D.

Reasons may also be used to inform the user 102 why an object was excluded. As shown in FIG. 6b, substitution 610 may indicate that a quality of product B in the initial product set A, B, C, D may, for example, be no longer at a particular standard and that is why it is excluded from the resulting set of A, C, D. Similarly, groups of objects may be excluded from resulting set for various reasons (e.g., as shown by substitution 612 in FIG. 6c—products B and C may be excluded as a group due to quality reasons). Group exclusions may, likewise, be time dependent. For example, as shown by substitution 614, products B and C may be excluded as a group from an intermediate result set of products A and D, on 2020-02-01 due to quality concerns. However, these products may be re-inserted on 2020-03-01 for a follow-on result set. Lastly, status of a group may be used to overrule exclusion status, where exclusions may be set to "inactive", "active", "obsolete", etc. The status may be inherited in a group hierarchy. For example, as shown by substitution 616, quality (as for example, related to product C) may be set as "inactive", whereby the resulting set may continue to include product C.

Figure 7:
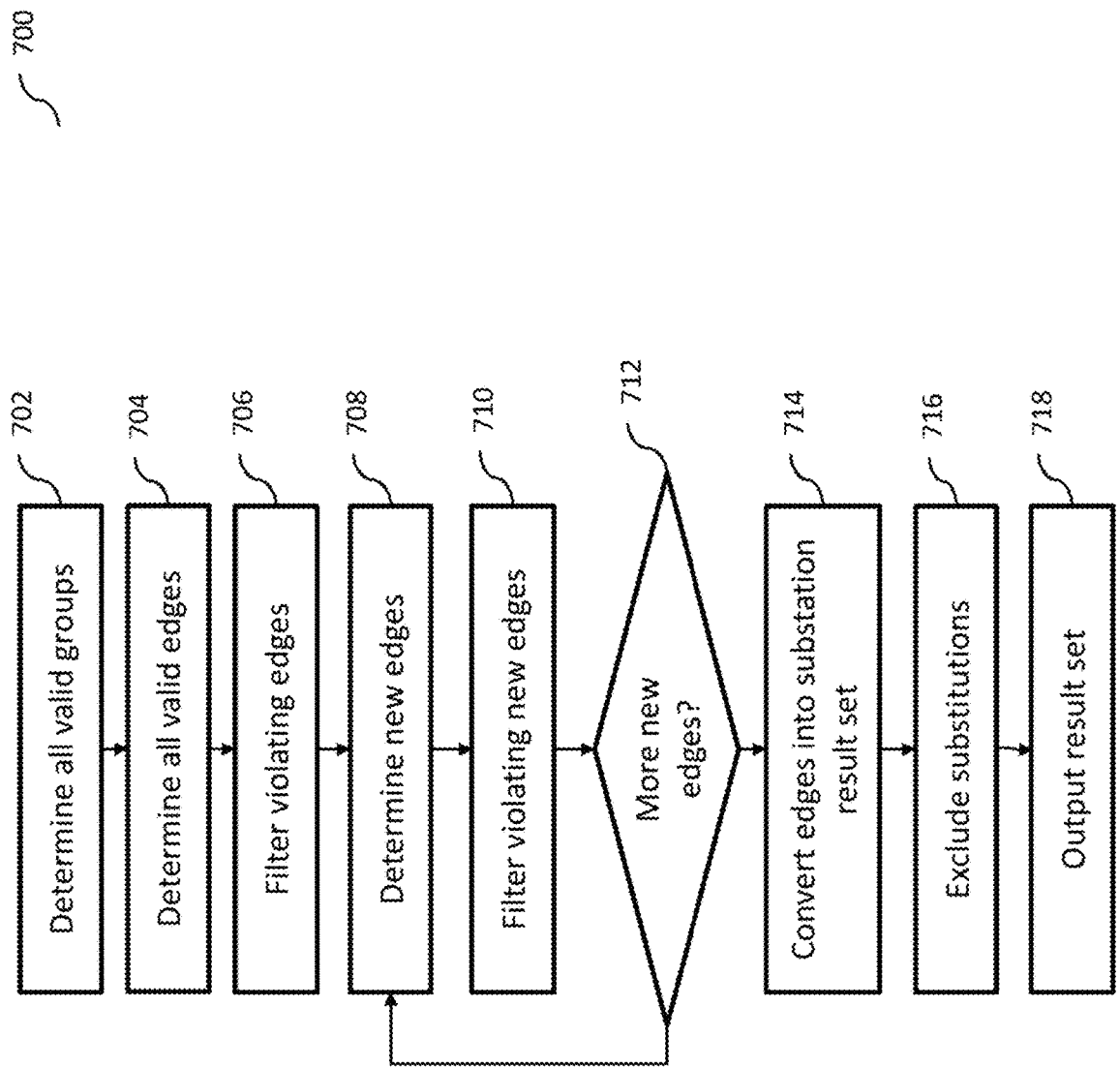
FIG. 7 illustrates an exemplary process for executing a substitution on a data set, according to some implementations of the current subject matter.

FIG. 7 illustrates an exemplary process 700 for executing a substitution on a data set, according to some implementations of the current subject matter. An input to the process 700, which may be executed as part of the process 300, may be an object, a control process, a valid-at, version, a simulation mode. Master data substitution tables 308 may be used for the purposes of determining substitutions for any objects, where an 'edge' may be an entry in the substitution table 308 and a 'new' edge may be an edge that was not processed before. A valid sub-graph may be a sequence of edges with the same group value (including, initial) and a version, where a 'substitute' of one edge is the 'object' of another edge. The result of the process 700 may be a master data substitution set (e.g., "MasterDataSubstitutionSet"). An object may be substituted by an object, a set of objects, etc. For example, as stated above, a product "headlight" may be substituted by the set of products "headlight house", "bulb", and two "screws". The set may be an optional attribute of a substitution. Moreover, master data substitution rules ("MasterDataSubstitutionRule") may be used. The rules may define technical requirements for a valid substitution. Substitutions that violate a rule may be filtered out in the substitution algorithms. The attributes of the rule may include ObjectTypeCode, Name, Description, etc.

At 702, all valid groups (including sub-groups and/or default group) for the particular control may be determined. At 704, all valid edges for the particular object and the determined groups may be determined. Edges violating specific rule(s) may be filtered out, at 706. New edges may be determined by following valid sub-graphs, at 708, where edges violating specific rules may be filtered out, at 710.

At 712, a determination may be made whether there are any more new edges. If so, the process 700 may be configured to return to 708. Otherwise, the process 700 may determine that no more new edges exist and may be configured to continue to 714, where the process 700 may be configured to convert edges into substitution result set. At 716, substitutions based on determined groups may be excluded from the result set. The result set may be outputted, at 718.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 8:
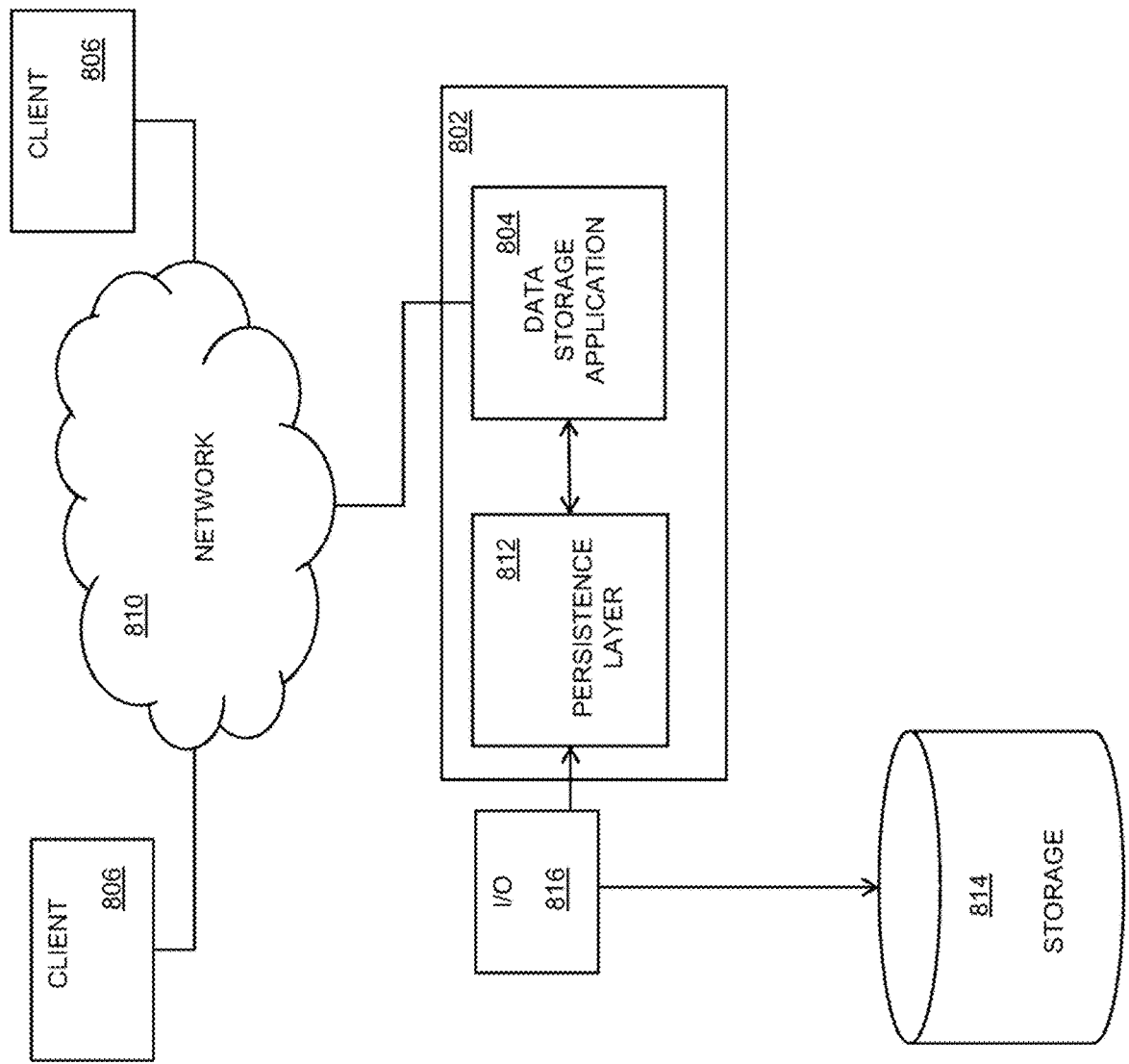
FIG. 8 is a diagram illustrating an exemplary system including a data storage application, according to some implementations of the current subject matter.

FIG. 8 illustrates an exemplary system 800 in which a computing system 802, which may include one or more programmable processors that may be collocated, linked over one or more networks, etc., executes one or more modules, software components, or the like of a data storage application 804, according to some implementations of the current subject matter. The data storage application 804 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 802 as well as to remote users accessing the computing system 802 from one or more client machines 806 over a network connection 810. One or more user interface screens produced by the one or more first modules may be displayed to a user, either via a local display or via a display associated with one of the client machines 806. Data units of the data storage application 804 may be transiently stored in a persistence layer 812 (e.g., a page buffer or other type of temporary persistency layer), which may write the data, in the form of storage pages, to one or more storages 814, for example via an input/output component 816. The one or more storages 814 may include one or more physical storage media or devices (e.g. hard disk drives, persistent flash memory, random access memory, optical media, magnetic media, and the like) configured for writing data for longer term storage. It should be noted that the storage 814 and the input/output component 816 may be included in the computing system 802 despite their being shown as external to the computing system 802 in FIG. 8.

Data retained at the longer term storage 814 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 9:
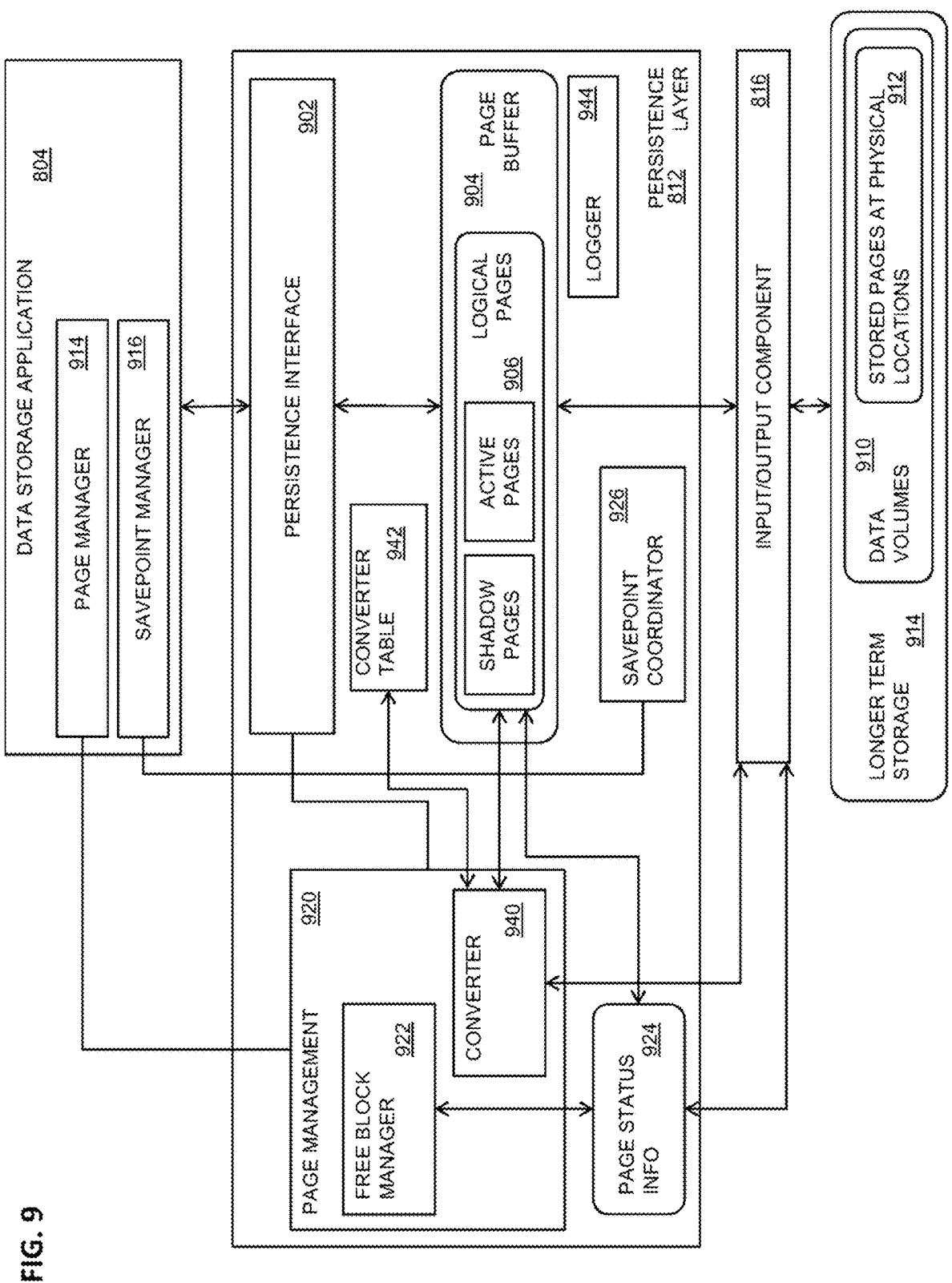
FIG. 9 is a diagram illustrating details of the system of FIG. 8.

FIG. 9 illustrates exemplary software architecture 900, according to some implementations of the current subject matter. A data storage application 804, which may be implemented in one or more of hardware and software, may include one or more of a database application, a network-attached storage system, or the like. According to at least some implementations of the current subject matter, such a data storage application 804 may include or otherwise interface with a persistence layer 812 or other type of memory butter, for example via a persistence interface 902. A page buffer 904 within the persistence layer 812 may store one or more logical pages 906, and optionally may include shadow pages, active pages, and the like. The logical pages 906 retained in the persistence layer 812 may be written to a storage (e.g. a longer term storage, etc.) 814 via an input/output component 816, which may be a software module, a sub-system implemented in one or more of software and hardware, or the like. The storage 814 may include one or more data volumes 910 where stored pages 912 are allocated at physical memory blocks.

In some implementations, the data storage application 804 may include or be otherwise in communication with a page manager 914 and/or a savepoint manager 916. The page manager 914 may communicate with a page management module 920 at the persistence layer 812 that may include a free block manager 922 that monitors page status information 924, for example the status of physical pages within the storage 814 and logical pages in the persistence layer 812 (and optionally in the page buffer 904). The savepoint manager 916 may communicate with a savepoint coordinator 926 at the persistence layer 812 to handle savepoints, which are used to create a consistent persistent state of the database for restart after a possible crash.

In some implementations of a data storage application 804, the page management module of the persistence layer 812 may implement a shadow paging. The free block manager 922 within the page management module 920 may maintain the status of physical pages. The page buffer 904 may include a fixed page status buffer that operates as discussed herein. A converter component 940, which may be part of or in communication with the page management module 920, may be responsible for mapping between logical and physical pages written to the storage 814. The converter 940 may maintain the current mapping of logical pages to the corresponding physical pages in a converter table 942. The converter 940 may maintain a current mapping of logical pages 906 to the corresponding physical pages in one or more converter tables 942. When a logical page 906 is read from storage 814, the storage page to be loaded may be looked up from the one or more converter tables 942 using the converter 940. When a logical page is written to storage 814 the first time after a savepoint, a new free physical page is assigned to the logical page. The free block manager 922 marks the new physical page as "used" and the new mapping is stored in the one or more converter tables 942.

The persistence layer 812 may ensure that changes made in the data storage application 804 are durable and that the data storage application 804 may be restored to a most recent committed state after a restart. Writing data to the storage 814 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 944 may also be included to store the changes made to the data of the data storage application in a linear log. The logger component 944 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 944 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 812 may use a combination of undo log entries (from one or more logs) and shadow paging.

The persistence interface 902 may handle read and write requests of stores (e.g., in-memory stores, etc.). The persistence interface 902 may also provide write methods for writing data both with logging and without logging. If the logged write operations are used, the persistence interface 902 invokes the logger 944. In addition, the logger 944 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 944. For an entry of type "update", for example, this would be the identification of the affected record and the after image of the modified data.

When the data application 804 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 944 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 944 may write a database log (or simply referred to herein as a "log") sequentially into a memory buffer in natural order (e.g., sequential order, etc.). If several physical hard disks/storage devices are used to store log data, several log partitions may be defined. Thereafter, the logger 944 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 804 may use shadow paging so that the savepoint manager 916 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 10:
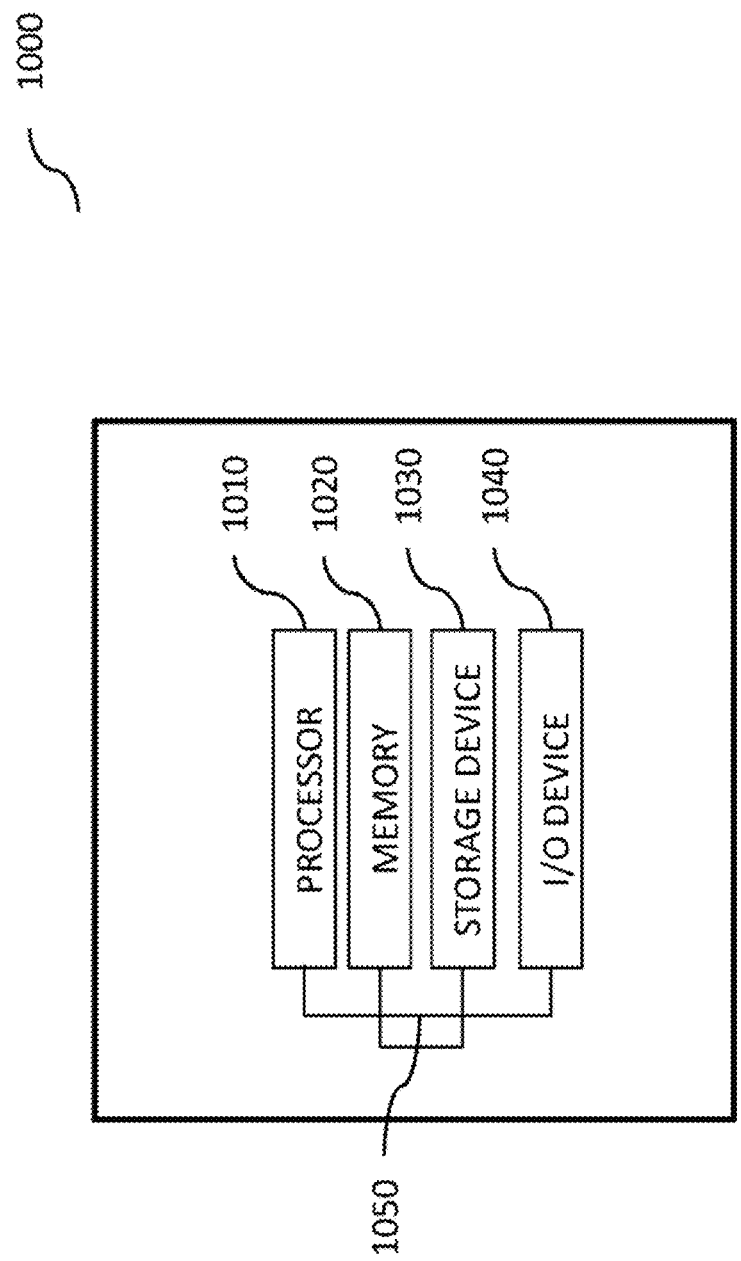
FIG. 10 is an exemplary system, according to some implementations of the current subject matter.

In some implementations, the current subject matter may be configured to be implemented in a system 1000, as shown in FIG. 10. The system 1000 may include a processor 1010, a memory 1020, a storage device 1030, and an input/output device 1040. Each of the components 1010, 1020, 1030 and 1040 may be interconnected using a system bus 1050. The processor 1010 may be configured to process instructions for execution within the system 1000. In some implementations, the processor 1010 may be a single-threaded processor. In alternate implementations, the processor 1010 may be a multi-threaded processor. The processor 1010 may be further configured to process instructions stored in the memory 1020 or on the storage device 1030, including receiving or sending information through the input/output device 1040. The memory 1020 may store information within the system 1000. In some implementations, the memory 1020 may be a computer-readable medium. In alternate implementations, the memory 1020 may be a volatile memory unit. In yet some implementations, the memory 1020 may be a non-volatile memory unit. The storage device 1030 may be capable of providing mass storage for the system 1000. In some implementations, the storage device 1030 may be a computer-readable medium. In alternate implementations, the storage device 1030 may be a floppy disk device, a hard disk device, an optical disk device, a tape device, non-volatile solid state memory, or any other type of storage device. The input/output device 1040 may be configured to provide input/output operations for the system 1000. In some implementations, the input/output device 1040 may include a keyboard and/or pointing device. In alternate implementations, the input/output device 1040 may include a display unit for displaying graphical user interfaces.

Figure 11:
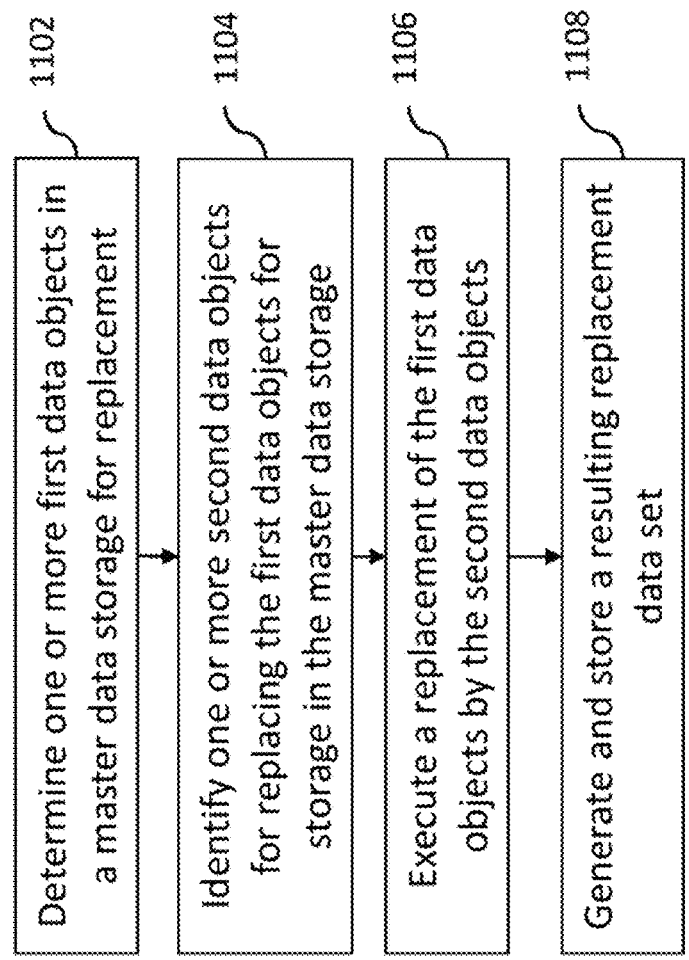
FIG. 11 is an exemplary method, according to some implementations of the current subject matter.

FIG. 11 illustrates an exemplary method 1100 for executing master data substitution, according to some implementations of the current subject matter. The process 1100 may be configured to be executed by the system 100 shown in FIG. 1, and in particular, the database management system 106. At 1102, one or more first data objects stored in a master data storage may be determined for a replacement or a substitution. The master data storage may be a master data set stored by a database 108 shown in FIG. 1. Substitution may be performed using systems 100, 300 shown in FIGS. 1, 3.

At 1104, one or more second data objects may be identified for replacing the first data objects for storage in the master data storage. For example, object "Battery" may be substituted by "Battery Varta". Replacement or substitution of the first data objects with the second data objects may be performed in accordance with one or more data object requirements. For example, such requirements may include one-to-one substitution, one-to-many substitution, many-to-one substitution, etc., as discussed above with regard to FIGS. 3a-6c.

At 1106, a replacement of the first data objects by the second data objects may be executed in accordance with in the one or more data object requirements. Exemplary substitutions are shown in FIGS. 3a-6c. At 1108, a resulting replacement data set may be generated and stored.

In some implementations, the current subject matter may include one or more of the following optional features. The data object requirements may include a requirement that the first data objects and the second data objects are equivalent data objects (e.g., equal substitution). The data object requirements may include a requirement that a number of the first data objects is replaced with the same number of the second data objects. The data object requirements may further include a requirement that a number of the first data objects is replaced with a smaller number of the second data objects. Also the data object requirements may include a requirement that a number of the first data objects are replaced with a greater number of the second data objects. Moreover, the data object requirements may include a requirement that the first data objects are replaced with the second data objects at one or more predetermined times. Further, the data object requirements may include a requirement that a group of the first data objects are replaced with a group of the second data objects.

Also, the data object requirements may include a requirement that at least one of the first data objects and the second data objects are excluded from the generated resulting data set. In some implementations, data objects may be excluded from the generated resulting data set based on at least one of the following: one or more predetermined periods of time, one or more versions of the first data objects, one or more groups of the first data objects, one or more statuses of the first data objects, and any combination thereof.

In some implementations, the data objects may be stored as graph data objects in one or more graph data tables in the master data storage. The graph data tables may include at least one of the following: one or more vertex tables, one or more edge tables, and any combination thereof. The graph data objects may include at least one of the following: one or more vertices, one or more edges, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows illustrated in the accompanying figures and/or described herein do not necessarily require the particular order shown, or sequential order, to achieve desirable results. Other implementations can be within the scope of the following claims.

What is claimed is:

1. A computer-implemented method, comprising:
   determining, by one or more processors, one or more first data objects in a master data storage for a replacement;
   identifying, by the one or more processors, one or more second data objects for replacing the one or more first data objects for storage in the master data storage, wherein the replacement of the one or more first data objects with the one or more second data objects is performed in accordance with one or more data object requirements;

executing, by the one or more processors, in accordance with the one or more data object requirements, the replacement of the one or more first data objects by the one or more second data objects;

generating, by the one or more processors, based on the replacement, a resulting replacement data set;

excluding, by the one or more processors, based on an object exclusion status and a group exclusion status overruling the object exclusion status, one or more objects from the resulting replacement data set to generate a filtered resulting replacement data set; and storing, by the one or more processors, the filtered resulting replacement data set.

2. The computer-implemented method of claim 1, wherein the one or more data object requirements comprise a requirement that the one or more first data objects and the one or more second data objects are equivalent data objects.

3. The computer-implemented method of claim 1, wherein the one or more data object requirements comprise a requirement that a number of the one or more first data objects is replaced with a same number of the one or more second data objects.

4. The computer-implemented method of claim 1, wherein the one or more data object requirements comprise a requirement that a number of the one or more first data objects is replaced a smaller number of the one or more second data objects.

5. The computer-implemented method of claim 1, wherein the one or more data object requirements comprise a requirement that a number of the one or more first data objects is replaced with a greater number of the one or more second data objects.

6. The computer-implemented method of claim 1, wherein the one or more data object requirements comprise a requirement that the one or more first data objects are replaced with the one or more second data objects at one or more predetermined times.

7. The computer-implemented method of claim 1, wherein the one or more data object requirements comprise a requirement that a group of the one or more first data objects is replaced with a group of the one or more second data objects.

8. The computer-implemented method of claim 1, wherein the one or more data object requirements comprise a requirement that at least one of the one or more first data objects and the one or more second data objects are excluded from the resulting data set.

9. The computer-implemented method of claim 8, wherein data objects are excluded from the generated resulting data set based on at least one of:

one or more predetermined periods of time, one or more versions of the one or more first data objects, one or more groups of the one or more first data objects, and any combination thereof.

10. The computer-implemented method of claim 1, wherein the one or more first data objects are stored as graph data objects in one or more graph data tables in the master data storage.

11. The computer-implemented method of claim 10, wherein the one or more graph data tables comprises at least one of the following: one or more vertex tables, one or more edge tables, and any combination thereof.

12. The computer-implemented method of claim 11, wherein the graph data objects comprise at least one of the following: one or more vertices, one or more edges, and any combination thereof.

13. A system comprising:
at least one programmable processor; and
a non-transitory machine-readable medium storing instructions that, when executed by the at least one programmable processor, cause the at least one programmable processor to perform operations comprising:

determining one or more first data objects in a master data storage for a replacement;

identifying one or more second data objects for replacing the one or more first data objects for storage in the master data storage, wherein the replacement of the one or more first data objects with the one or more second data objects is performed in accordance with one or more data object requirements;

executing, in accordance with in the one or more data object requirements, the replacement of the one or more first data objects by the one or more second data objects;

generating, based on the replacement, a resulting replacement data set;

excluding based on an object exclusion status and a group exclusion status overruling the object exclusion status, one or more objects from the resulting replacement data set to generate a filtered resulting replacement data set; and storing the filtered resulting replacement data set.

14. The system according to claim 13, wherein the one or more data object requirements include a requirement that the one or more first data objects and the one or more second data objects are equivalent data objects.

15. The system according to claim 13, wherein the one or more data object requirements include a requirement that a number of the one or more first data objects is replaced with a same number of the one or more second data objects.

16. The system according to claim 13, wherein the one or more data object requirements include a requirement that a number of the one or more first data objects is replaced with either a smaller number or a greater number of the one or more second data objects.

17. The system according to claim 13, wherein the one or more data object requirements include a requirement that the one or more first data objects are replaced with the one or more second data objects at one or more predetermined times.

18. The system according to claim 13, wherein the one or more data object requirements include a requirement that a group of the one or more first data objects is replaced with a group of the one or more second data objects.

19. The system according to claim 13, wherein the one or more data object requirements include a requirement that at least one of the one or more first data objects and the one or more second data objects are excluded from the resulting data set;

wherein data objects are excluded from the generated resulting data set based on at least one of the following: one or more predetermined periods of time, one or more versions of the one or more first data objects, one or more groups of the one or more first data objects, one or more statuses of the one or more first data objects, and any combination thereof.

20. A computer program product comprising a non-transitory machine-readable medium storing instructions that, when executed by at least one programmable processor, cause the at least one programmable processor to perform operations comprising:

determining one or more first data objects in a master data storage for a replacement;

identifying one or more second data objects for replacing the one or more first data objects for storage in the master data storage, wherein the replacement of the one or more first data objects with the one or more second data objects is performed in accordance with one or more data object requirements;

executing, in accordance with the one or more data object requirements, the replacement of the one or more first data objects by the one or more second data objects;

generating, based on the replacement, a resulting replacement data set;

excluding based on an object exclusion status and a group exclusion status overruling the object exclusion status, one or more objects from the resulting replacement data set to generate a filtered resulting replacement data set; and storing the filtered resulting replacement data set.

* * * * *